US012656503B2

(12) United States Patent
Davain et al.

(10) Patent No.: US 12,656,503 B2
(45) Date of Patent: Jun. 16, 2026

(54) NAVIGATION DURING A DECEPTION OPERATION OF A SATELLITE SIGNAL RECEIVER

(71) Applicant: SAFRAN ELECTRONICS & DEFENSE, Paris (FR)

(72) Inventors: Loïc Davain, Moissy-Cramayel (FR); Julien Nguyen, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 342 days.

(21) Appl. No.: 18/547,128

(22) PCT Filed: Feb. 3, 2022

(86) PCT No.: PCT/EP2022/052631
§ 371 (c)(1),
(2) Date: Aug. 18, 2023

(87) PCT Pub. No.: WO2022/175104
PCT Pub. Date: Aug. 25, 2022

(65) Prior Publication Data
US 2024/0319382 A1     Sep. 26, 2024

(30) Foreign Application Priority Data
Feb. 19, 2021     (FR) ....................................... 2101629

(51) Int. Cl.
G01S 19/21          (2010.01)
(52) U.S. Cl.
CPC .................................. G01S 19/215 (2013.01)

(58) Field of Classification Search
CPC .................................................. G01S 19/00–55
See application file for complete search history.

(56) References Cited

U.S. PATENT DOCUMENTS 10,641,906 B2 *   5/2020   Altrichter .............. G01S 19/49
2009/0254278 A1 *  10/2009  Wang ................... G01S 19/215
                                                            701/472

(Continued)

FOREIGN PATENT DOCUMENTS

EP          3680617 A1      7/2020

OTHER PUBLICATIONS

Kaplan, Elliott D. et al., "Understanding GPS Principles and Applications", Artech House, 2nd ed., 2006 (Year: 2006) pp. 28, 466, 496 (Year: 2006).*

(Continued)

*Primary Examiner* — Cassi J Galt
(74) *Attorney, Agent, or Firm* — MUNCY, GEISSLER, OLDS & LOWE, P.C.

(57) ABSTRACT

A navigation method based on satellite positioning data and non-satellite positioning data includes the following steps of: computing a first reference navigation that is hybridised on the basis of non-satellite positioning data and satellite positioning data, the first reference navigation being reset on the satellite positioning data; performing a statistical analysis of the positional corrections provided by the first reference navigation and deducing therefrom the existence or the absence of a deception operation of the satellite signal receiver. A navigation system for implementing this method is disclosed.

23 Claims, 2 Drawing Sheets

(56)          References Cited

U.S. PATENT DOCUMENTS

| | | | | |
|---|---|---|---|---|
| 2010/0299003 | A1* | 11/2010 | Hanson ................ | G01C 21/183 |
| | | | | 701/4 |
| 2013/0169478 | A1* | 7/2013 | Vourc'h ................ | G01S 19/20 |
| | | | | 342/357.58 |
| 2014/0333479 | A1* | 11/2014 | Steinhardt .............. | G01S 19/28 |
| | | | | 342/357.67 |
| 2018/0088241 | A1 | 3/2018 | Altrichter | |
| 2019/0302272 | A1* | 10/2019 | Balog ................... | G01S 19/215 |
| 2021/0318139 | A1* | 10/2021 | Loch ....................... | G01S 19/21 |
| 2022/0057526 | A1* | 2/2022 | Keyzer .................. | G01S 19/26 |

OTHER PUBLICATIONS

Liu et al, "Impact Assessment of GNSS Spoofing Attacks on INS/GNSS Integrated Navigation System", Sensors, vol. 18, Jan. 1, 2018 (Jan. 1, 2018), 20 pages.

* cited by examiner

NAVIGATION DURING A DECEPTION OPERATION OF A SATELLITE SIGNAL RECEIVER

The present invention relates to the field of navigation and more specifically, positioning and navigation by means, in particular, of receiving satellite signals emitted by satellites belonging to a satellite constellation around the Earth.

BACKGROUND OF THE INVENTION

The positioning by (or GNSS, "Global Navigation Satellite System") is mainly implemented by GPS, Galileo, GLONASS and BeiDou systems. The invention relates more specifically to inertial navigation assisted by receiving satellite signals.

Satellite positioning consists of receiving signals emitted by satellites, the position of which is known and of deducing from the duration (or flight time), between the emission and the reception of each of the signals, a so-called pseudo-distance measurement separating the satellite signal receiver (commonly, and sometimes incorrectly, called GPS receivers) and each of the satellites, the signal of which has been received (each signal comprising a satellite ID and the emission time of the signal). Thus, it suffices to have signals from four satellites to estimate the latitude, the longitude and the altitude of the receiver, as well as a time difference, but the positioning is even more accurate than the number of satellites is high, the signals of which have been considered by the receiver to compute its position.

It results that this positioning system, which is relatively accurate, has become widespread, and nowadays many vehicles are fitted with a satellite signal receiver. Due to the drop in costs of the satellite signal receivers and consumer electronics, most people further have smartphone-type mobile phones, themselves provided with a satellite signal receiver.

In parallel with this development of satellite signal receivers, deception (spoofing) devices have appeared in order to "deceive" (or "spoof") these satellite signal receivers. Such a device comprises an electronic processing unit connected to a radiofrequency signal emitter for emitting fraudulent signals having the features of satellite signals. More specifically, the electronic processing unit is arranged to develop, from an actual initial position of a satellite signal receiver, fraudulent signals which, when they are captured by the satellite signal receiver, lead to the satellite signal receiver computing an erroneous position. The actual initial position of the satellite signal receiver can be detected, for example, by means of a laser rangefinder or communicated by the vehicle embedding the satellite signal receiver as certain navigation rules impose, in particular aerial and maritime (ADS-B or AIS signals emitted by a vehicle to communicate its position to nearby vehicles).

So that the fraudulent signals are considered by a satellite signal receiver, it does not suffice to emit the fraudulent signals with a power greater than the power of the original satellite signals. It is also necessary for the fraudulent signals to have the same code phase and a Doppler effect lying in the same range as the satellite signals that were previously being received by the satellite signal receiver. If the first received fraudulent signal is consistent with the latest position computed by the satellite signal receiver and with the previously received satellite signals, and if the fraudulent signals that are received subsequently are consistent with one another, then the fraudulent signals will be used by the satellite signal receiver as if they were true satellite signals, and the error relating to the actual position of the satellite signal receiver cannot be detected.

Hybrid inertial navigation systems are known which merge inertial positioning data coming from a navigation inertial unit and satellite positioning data coming from a satellite signal receiver. These navigation systems integrate one or more Kalman filters arranged, such that the hybrid navigation is reset on the satellite positioning data. The Kalman filter is protected by an innovation test to detect the outliers and reject them. However, if the fraudulent signals have sufficient consistency, then they can satisfy this innovation test and it is therefore thus possible to bring the hybrid navigation to follow the deceived position. Furthermore, if avoiding false alerts is desired, it is necessary to implement a relatively high detection threshold, which increases the deception risk. Yet, in these systems, these are the satellite positioning data which make it possible to compensate for the errors of the inertial positioning data in the long term, such that fraudulent signals would lead to a navigation error despite the hybridation of satellite positioning data with inertial positioning data.

It is therefore understood that the implementation of such deceiving devices can be harmful to the safety of a deceived vehicle and possibly also to the safety of other vehicles moving in the same zone as the deceived vehicle.

AIM OF THE INVENTION

The invention has the particular aim of detecting a deceiving operation.

SUMMARY OF THE INVENTION

To this end, a navigation method according to the invention is provided, by means of a satellite signal receiver embedded in a vehicle comprising an electronic navigation unit connected to the satellite signal receiver and to an inertial positioning unit to compute an operational navigation that is hybridised on the basis of inertial positioning data and satellite positioning data by applying an innovation test, the method comprising the following steps:

computing a first reference navigation that is hybridised on the basis of inertial positioning data with positional corrections determined on the basis of satellite positioning data;

recovering the positional corrections in latitude and in longitude provided by the first reference navigation;

performing a statistical analysis of the positional corrections provided by the first reference navigation and deducing therefrom the existence or the absence of a deception operation of the satellite signal receiver.

Thus, the method according to the invention makes it possible to detect an exposure of a satellite signal receiver to a deception operation. It is subsequently possible to alert the user of the existence of this deception operation, to detect the end of the exposure to the fraudulent signals and establish relatively rapidly the nominal performance of the navigation. The detection of the deception operation by statistical analysis of the positional errors is relatively rapid and reliable.

Preferably, the operational navigation and the first reference navigation are distinct from one another and the first reference navigation is determined without an innovation test.

It is understood that the method of the invention makes it possible to have both an accurate operational navigation in the absence of deception, and a particularly effective detection of any deception attempt.

According to a first implementation, the statistical analysis comprises the cumulation of positional corrections provided by the first reference navigation, and the comparison of this cumulation at a first predetermined threshold to distinguish the existence of a deception operation and the absence of a deception operation.

In the absence of deception, the positional corrections mainly result from the noise of the satellite positioning data. This noise is random and of zero mean such that, in the absence of deception, the mean of the positional corrections cumulated over a predetermined duration is substantially zero.

According to a second embodiment, alternative or combined with the first embodiment, the statistical analysis comprises the computing of a correlation coefficient between the positional corrections in latitude and the positional corrections in longitude provided by the first reference navigation, and the comparison of the correlation coefficient to a second predetermined threshold to distinguish the existence of a deception operation and the absence of a deception operation.

According to a third embodiment, alternative to the two preceding ones, or combined with at least one of these, the statistical analysis comprises the determination of successive correction directions on the basis of positional corrections in latitude and positional corrections in longitude provided by the first reference navigation, the computing of a variability coefficient of the correction directions and the comparison of the variability coefficient to a third predetermined threshold to distinguish the existence of a deception operation and the absence of a deception operation.

In the second embodiment and the third embodiment, it is sought if the corrections are random, as this should be the case in the absence of deception. If the corrections are random, the positional corrections in latitude are decorrelated from the positional correction in longitude (second embodiment) and the successive correction directions have a great variability from one another (third embodiment).

Advantageously, the method further comprises the following steps of:

computing a second reference navigation on the basis of inertial positioning data;

comparing an output of the first reference navigation and an output of the second reference navigation and deducing therefrom the existence or the absence of a deception operation of the satellite signal receiver.

Thus, preferably, the method comprises the step of determining a difference between the speed coming from the first reference navigation and the speed coming from the second reference navigation and of comparing this difference to a predetermined threshold.

This makes it possible to very simply and very reliably detect a deception.

Alternatively, or combined with the speed comparison, the method comprises the steps of estimating, on the basis of the first reference navigation, at least one error estimation of at least one inertial sensor of the inertial positioning unit and of comparing the estimation to a predetermined threshold.

This makes it possible to very simply and very reliably detect a deception.

The invention also aims for an electronic navigation unit programmed to implement the method above.

Other features and advantages of the invention will appear upon reading the following description of a particular and non-limiting embodiment of the invention.

BRIEF DESCRIPTION OF THE DRAWINGS

Reference will be made to the accompanying drawings, among which.

DETAILED DESCRIPTION OF THE INVENTION

Figure 1:
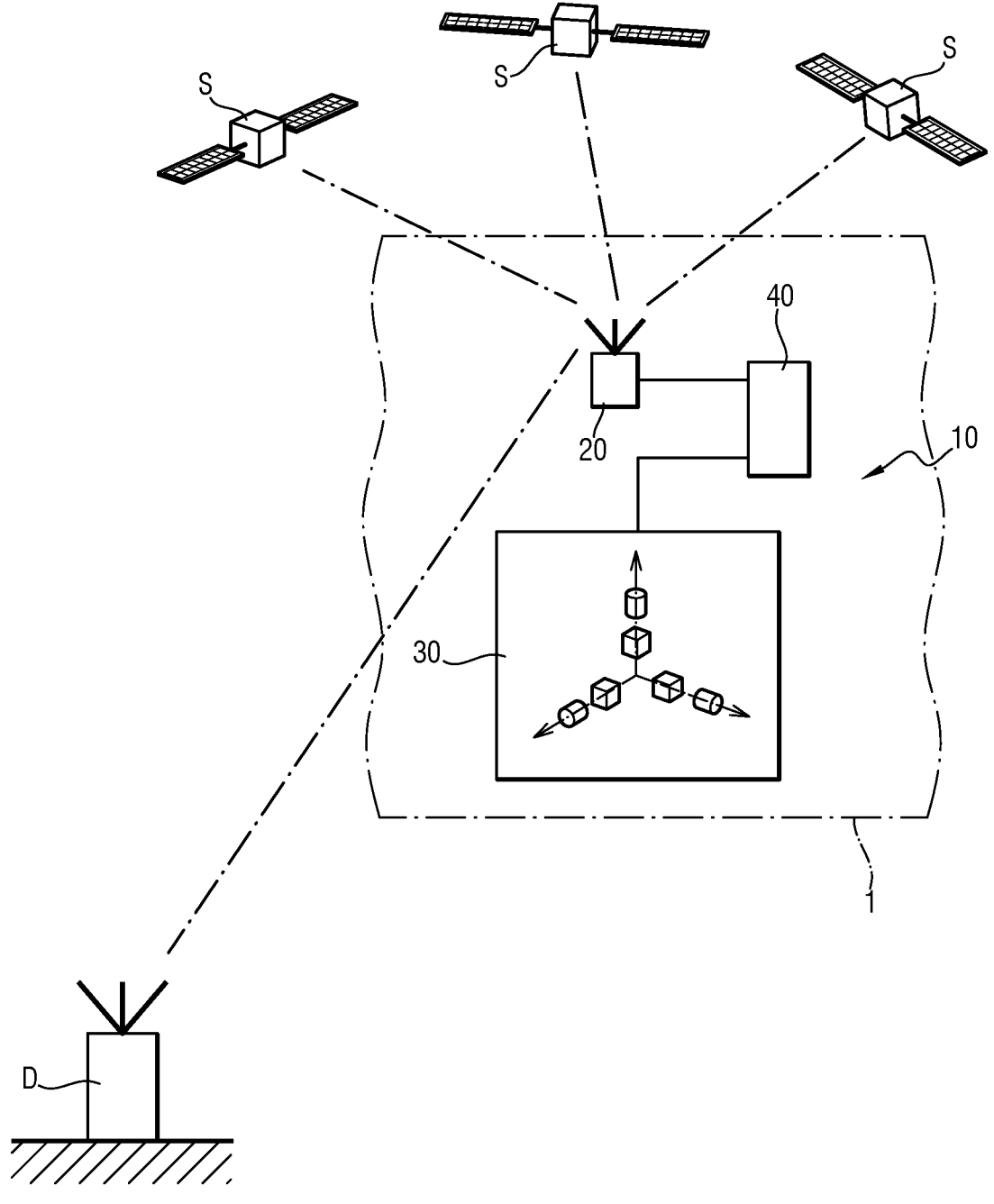
FIG. 1 is a schematic view of a device for the implementation of the method of the invention during a deception operation.

In reference to the figure, the invention is described, in this case, in application of an aircraft 1 fitted with a hybridised navigation system generally referenced as 10 comprising a satellite signal receiver 20 and an inertial positioning unit 30 which are connected to an electronic navigation unit 40.

The satellite signal receiver 20 is arranged, in a manner known per se, to receive satellite positioning signals emitted by satellites of a satellite constellation S of at least one satellite positioning system (GNSS)—such as GPS, Galileo, GLONASS and BeiDou—and to compute, on the basis of these satellite signals, satellite positioning data such as a pseudo-distance, a phase measurement, a latitude, a longitude, an altitude, and a time difference. Such a receiver is known per se.

The inertial unit 30 comprises an inertial measurement unit comprising inertial sensors, in this case conventionally three accelerometers disposed along the axes of a measurement system and three gyrometers disposed to measure rotations of this measurement system with respect to a reference system. The inertial positioning unit 30 further comprises, in a manner known per se, an electronic processing unit (processor or other electronic circuit capable of computing) arranged to determine inertial positioning data, such as positional data, altitude and speeds, on the basis of measurement signals produced by the inertial sensors. Such a unit is known per se.

The electronic navigation unit 40 comprises one or more processors and a memory containing at least one program containing instructions implementing the method of the invention. In particular, the electronic navigation unit 40 is programmed to compute, at predetermined instants, the coordinates (latitude and longitude) of the point of the passage of the vehicle by using the positioning data provided by the satellite signal receiver 20 and the inertial measuring unit 30 at each of these instants. All of these points form a route or a path, generally called "navigation", which must coincide as close as possible with the actual path followed by the vehicle.

During the execution of this program, the electronic navigation unit 40 computes a primary operational navigation that is hybridised on the basis of inertial positioning data and of satellite positioning data. The hybridised navigation can be based on a loose coupling in position (and/or speed) or a close coupling in pseudo-distance (and/or delta range). To achieve the hybridation, the program implements a Kalman filter which comprises a filter bank and which is protected by an innovation test aiming to verify the consistency of the satellite positioning data with one another. The innovation test is known per se and makes it possible to detect and reject outliers.

The primary operational navigation is used in nominal mode to control the vehicle in order to make the vehicle follow a predetermined route.

The method of the invention aims to detect a deception operation during which a deceiving device D, in this case on the ground, knowing the actual position of the aircraft 1, emits fraudulent satellite signals intended to be received by the satellite signal receiver 20 and to be considered in the computing of the hybridised navigation instead of authentic satellite signals to lead the aircraft 1 over an actual path, different from that indicated by the navigation system (i.e. different from the primary operational navigation). The structure and the operation of the deceiving device D are known per se and will not be described further in this case.

In order to detect such a deceiving operation, the electronic navigation unit 40 is further arranged to execute deception detection processes, processes which are, in this case, advantageously combined.

To implement the deception detection method of the invention, and whatever the process implemented, the electronic navigation unit 40 computes another navigation, namely a first reference navigation that is hybridised on the basis of inertial positioning data with positional corrections determined on the basis of satellite positioning data. The first reference navigation is thus reset on the satellite positioning data.

The first reference navigation is not an operational navigation: it only serves to detect the deception. To force the first reference navigation to be sensitive (or subjected) to deception, the innovation test is deactivated.

The first two detection processes implemented require:

recovering the positional corrections in latitude and in longitude provided by the first reference navigation;

performing a statistical analysis of the positional corrections provided by the first reference navigation and deducing therefrom the existence or the absence of a deception operation of the satellite signal receiver.

During the development of the first reference navigation, which is hybridised, the electronic navigation unit 40 periodically determines a positional correction between a purely inertial position computed on the basis of inertial positioning data and a purely satellite position computed on the basis of satellite positioning data. These are successive positional corrections which are recovered in view of detecting deception. The corrections can be maintained as they are estimated in the case of an open loop filter, or applied at each instant to the inertial navigation computed in the case of a closed loop filter.

According to a first detection process, the statistical analysis comprises the cumulation of positional corrections provided by the first reference navigation. The cumulation of positional corrections is, in this case, performed over a sliding time window, for example of a duration of three minutes. It will be noted that the cumulation of corrections advantageously provides a relevant image of the positioning error caused by the deception when it is present.

The comparison of this cumulation of positional corrections is then proceeded with at a first predetermined threshold. The first threshold is fixed to correspond to the acceptable upper limit such that the computed cumulation corresponds to that of the random positional errors considering an acceptable probability of false alert and an acceptable probability of non-detection. Normal statistical features (mean and standard deviation) of the values considered are also considered, i.e. in the absence of deception.

The existence of a deception operation is validated when the cumulation is greater than the first threshold.

According to the second detection process, the statistical analysis comprises the computing of a correlation coefficient between the positional corrections in latitude and the positional errors in longitude provided by the first reference navigation.

The correlation coefficient is then compared to a second predetermined threshold. The second threshold is fixed to correspond to the acceptable upper limit such that the computed correlation coefficient corresponds to that of random positional correction considering an acceptable probability of false alert and of an acceptable probability of non-detection.

The existence of a deception operation is validated when the correlation coefficient is greater than the second threshold.

Alternatively, according to the second process, the statistical analysis comprises the determination of successive correction directions on the basis of positional corrections in latitude and positional corrections in longitude provided by the first reference navigation.

A variability coefficient of the correction directions is then computed and compared to a third predetermined threshold. The variability coefficient is, in this case, variance. The third threshold is fixed to correspond to the acceptable lower limit such that the computed variability coefficient corresponds to that of random positional errors considering an acceptable probability of false alert and an acceptable probability of non-detection.

The existence of a deception operation is validated when the variability coefficient is less than the third threshold.

It will be noted that it can also be monitored, if there are correlations with the horizontal speed corrections (traditionally referenced Vx and Vy) which can enable to detect a deception operation, like correlations between the positional corrections in latitude and the positional corrections in longitude.

According to a third detection process, the electronic navigation unit 40 computes a second reference navigation only on the basis of inertial positioning data.

The second reference navigation can result from the implementation of a non-reset Kalman filter.

The electronic navigation unit 40 then compares an output of the first reference navigation and an output of the second reference navigation and deduces therefrom the existence or the absence of a deception operation of the satellite signal receiver.

In the first reference navigation, the Kalman filter is configured to reset the navigation on the satellite data such that, in case of deception, the Kalman filter will produce an abnormal modelling of the inertial sensor errors. Thus, the first reference navigation is forced to follow the satellite data even when they would be erroneous. Having the first reference navigation and the second reference navigation makes it possible to compare the dynamics of the inertial navigation with the dynamics of the hybridised navigation which is forced to follow the satellite data.

The electronic navigation unit 40 is arranged to determine a difference between the speed coming from the first reference navigation and the speed coming from the second reference navigation and to compare this difference to a predetermined threshold. The predetermined threshold is equal to a multiple of a standard deviation computed from a speed difference distribution law, the multiple preferably being 4.

According to a fourth deception detection process, the electronic navigation unit 40 is arranged to estimate on the basis of the first reference navigation at least one error estimation of at least one inertial sensor of the non-satellite positioning unit and to compare the estimation to a predetermined threshold. The electronic navigation unit 40 is, in this case, arranged to estimate for the first reference navigation, at least one gyrometric drift and to compare the estimated gyrometric drift to a predetermined threshold. In this case, three gyrometric drifts are estimated here:

two horizontal drifts;
a heading drift.

For each of these three drifts, the predetermined threshold is equal to a multiple of a standard deviation computed on the basis of a drift distribution law, the multiple preferably being equal to 4.

It will be noted that the use of a threshold that is not fixed but is based on the standard deviations computed by the hybridation filters makes it possible to improve the sensitivity of the deception detection by considering the current quality of the navigations computed, and thereby by considering the natural features of a non-reset navigation (Schuler period, 24-hour oscillation).

According to a fifth detection process, the primary operational navigation (which implements an innovation test) is monitored in order to ensure that the innovation test does not recover a rejection rate greater than a predetermined threshold representative of an abnormality.

When one of the detection processes reveals a deception operation, it returns an alert. It will be noted that the detection processes are executed simultaneously by one same computer program such that all the detection processes are simultaneously and independently active.

However, the first and the second process enable a detection of a deception operation more rapidly than the other processes, such that the latter will more often serve to confirm the detection. To increase the detection speed and to ensure that the cumulation of the positional corrections does not exceed the horizontal protection limit (usually called HPL), if there is one, as it is commonly the case in civil aviation, preferably relatively low detection thresholds will be chosen, even if it means increasing the probability of a false alert.

It will also be noted that the second process is normally more rapid that the first process.

The method of the invention, in this particular embodiment, combines the results of the detection processes to evaluate the credibility of the threat.

Thus, the electronic navigation unit 40 can be programmed to emit a credible threat alert as soon as one of the detection processes has identified an abnormal behaviour. The alert can also have different levels, according to which:

the fourth detection process has emitted an alert for at least one of the inertial sensors monitored;
the fourth detection process has emitted an alert simultaneously for several of the inertial sensors monitored;
the fourth detection process has emitted an alert simultaneously for all the inertial sensors monitored;
the primary operational navigation (which implements an innovation test) recovers an abnormal rejection rate.

The electronic navigation unit 40 is arranged to establish a score of the threat which is incremented by 1 each time that one of the criteria above is satisfied. The score can therefore be between 1 and 7, and;

It could be considered that:
a score equal to 1 or 2 indicates a threat that is barely credible;
a score equal to 3 or 4 indicates a potential threat;
a score at least equal to 5 indicates the credible presence of a threat.

It will be noted that it is important to preserve a distinct operational navigation of the two reference navigations, as the satellite signal receiver can be subjected to a deception operation for several tens of minutes: it would therefore not be possible to only rely on the inertial positioning data from this to ensure the navigation.

The invention further provides, in this case, to correct the operational navigation for the time of the deception operation to obtain an operational emergency navigation.

Indeed, if a deception operation is detected, and it is perceived that it has been sufficiently effective for deceiving the primary operational navigation, it is no longer possible to rely on the primary operational navigation and the second inertial navigation is not usable for more than a few minutes. It is therefore interesting to have an operational emergency navigation.

The computing of the operational emergency navigation could be limited to resetting the primary operational navigation by using the cumulation of the positional corrections. However, the speed error induced by the deception operation would not be corrected.

According to a particular feature of the invention, the operational emergency navigation is based on the second reference navigation and the computing of the operational emergency navigation comprises the following steps of:

at the instant where a deception operation is detected, resetting the second reference navigation on the primary operational navigation to obtain a corrected position and resetting the correct position according to the cumulation of the positional corrections computed on the basis of the first reference navigation to obtain a starting position of the operational emergency navigation;
determining subsequent positions on the basis of speed information provided by the second reference navigation.

Figure 2:
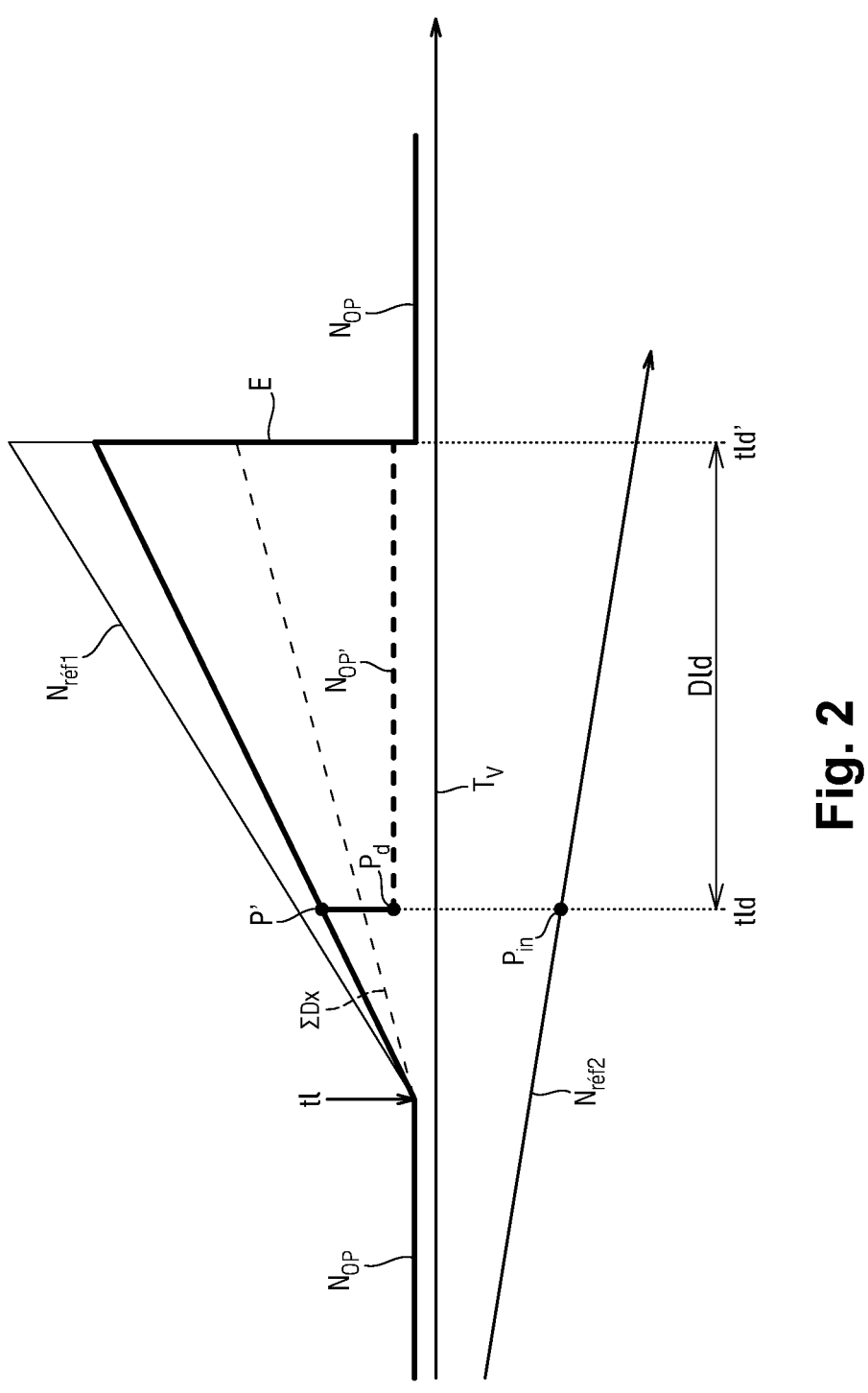
FIG. 2 is a schematic view of the paths provided by the different navigations, in a horizontal plane.

In FIG. 2, the following are represented:
the actual path Tv of the vehicle;
the path Nop coming from the primary operational navigation;
the path Nop' coming from the operational emergency navigation;
the path Nref1 coming from the first reference navigation;
the path Nref2 coming from the second reference navigation.

The path Nop coming from the primary operational navigation remains close to the real path until the start tl of the deception operation: from this instant, the path Nop moves progressively away from the actual path Tv, just like the path Nref1 coming from the first reference navigation extends from the actual path Tv from the start of the deception operation.

At the time of detecting the deception operation tld, the operational emergency navigation starts: the position Pin computed on the basis of inertial positioning data at the instant of detecting the deception operation is reset on the position P' which corresponds to the position provided at the same instant by the primary operational navigation. The position P' is then corrected according to the cumulation of the positional corrections $\Sigma Dx$ computed on the basis of the first reference navigation to obtain a starting position Pd of the operational emergency navigation. The subsequent positions of the path Nop' coming from the operational emergency navigation are computed on the basis of the starting position Pd and of the speed information provided by the second reference navigation.

It is understood that the second reference navigation serves, on the one hand, to detect the deception operation, then forms, after resetting, the operational emergency navigation. This resetting enables the operational emergency navigation to provide a starting position Pd close to the actual position of the vehicle and the positions subsequently defined are, themselves, relatively close to the actual position of the vehicle, as they have been computed, from the reset position, by using non-deceived speed information (since constituted of inertial positioning data which are not affected by the deception operation). The operational emergency navigation is only used, in this case, for the duration Dld during which the deception operation is detected.

It is therefore important to be able to detect an end tld' of the deception operation to use again, and confidently, the primary operational navigation to guide the vehicle.

Generally, at the time where the satellite signal receiver 20 escapes the deception operation (generally, because the satellite signal receiver 20 arrives outside of the reach of the deceiving device D, or that said device D has stopped), the position provided by the first reference navigation is highly offset with respect to the preceding positions provided by the first reference navigation (this should be called abnormally offset, given the speed and the manoeuvring capacities of the vehicle). This sudden positional offsetting (which can be seen in E in FIG. 2: also, a level is referred to in the path Nref1) can therefore be used as a signal for stopping the use of the operational emergency navigation and restart using the primary operational navigation.

According to an additional feature of the invention, the use of the operational emergency navigation is interrupted when the path provided by the first reference navigation is suddenly returned to the path Nop' coming from the operational emergency navigation. In other words, the position provided by the first reference navigation is suddenly close to the position provided by the operational emergency navigation by creating a level in the path provided by the first reference navigation.

When such a level is detected, the deception operation is considered as ended: the operational emergency navigation is abandoned in favour of the primary operational navigation which is used again to guide the vehicle.

Naturally, the invention is not limited to the embodiment described, but covers any variant coming within the scope of the invention such as defined by the claims.

In particular, the navigation system of the vehicle can be different from that described.

The vehicle can be fitted with a plurality of inertial units, each providing an inertial navigation. It could be provided to use each of these inertial navigations as a reference navigation for detecting deception: there will therefore be as many distinct detection processes which will be combined to ensure a consolidated detection. In a variant, only some of the inertial navigations can be used as a reference navigation. Still in a variant, it is possible to use a mean of all or some of these inertial navigations to form a reference navigation for detecting deception.

The electronic navigation unit can be integrated in the inertal positioning unit: one single computer can thus be used.

Moreover, for computing different indicators (cumulation and correction direction), it is possible to use a first reference navigation implementing an innovation test. Thus, the operational navigation (with innovation test) can be used as a first reference navigation, thus simplifying the architecture of the solution and detriment of a degradation of the detection performance. The operational navigation and the first reference navigation indeed only make one, the operational navigation having a dual function: making it possible to guide the vehicle and serve as a basis for computing different indicators (cumulation and correction direction). Preferably, however, the first reference navigation is distinct from the operational navigation and does not implement an innovation test to be more sensitive to deception.

For an application to a satellite receiver arranged to receive satellite signals from satellites of several satellite positioning systems (GNSS), it will advantageously be provided to detect deception for each of these systems.

The predetermined speed threshold can be different from that mentioned above and, for example, equal to:

a multiple of a standard deviation computed on the basis of a speed difference distribution law, the multiple preferably being 3;

a predetermined speed difference value, preferably around 3 metres a second.

The electronic navigation unit 40 can be arranged to estimate, for the first reference navigation, at least one accelerometric bias and compare the estimated accelerometric bias to a predetermined threshold.

Independently of other processes, the method can comprise the following steps of:

determining a difference between the speed coming from the first reference navigation and the speed coming from the second reference navigation, and compare this difference to a predetermined threshold;

estimating on the basis of the first reference navigation, at least one accelerometric bias and comparing it to a predetermined threshold;

estimating on the basis of the first reference navigation, at least one gyrometric drift and comparing it to a predetermined threshold;

emitting an alert in case of exceeding one of the predetermined thresholds.

It is possible, but not compulsory, to attribute a minimum score to the first threshold exceeding and to raise it each time that another threshold is exceeded, the probability of existence of a deception operation being proportional to the number of exceedings.

The method can comprise the following steps of:

estimating on the basis of the first reference navigation, sensor errors of the inertial positioning unit;

comparing the error estimation of each sensor to a predetermined threshold;

emitting an alert according to the number of threshold exceedings, the probability of existence of a deception operation being proportional to the number of exceedings.

Although the combination of the detection processes is extremely effective, the invention applies to the use of only one of these navigation processes, or two or more in association.

The program can implement one or more Kalman filters.

The scoring system can be different from that described. In the case where N detection processes are implemented, it can be provided that the score varies from 1 to N, with:

a score less than N/3 to indicate a threat that is barely credible;

a score of between N/3 and 2·N/3 to indicate a potential threat;

a score greater than 2·N/3 to indicate the credible presence of a threat.

Other scoring choices are possible, in order to limit the risks of false alert or of non-detection.

The positional corrections can be cumulated for a duration different from that mentioned. For example, the cumulation of positional corrections can be performed from the switching on of the electronic navigation unit and no longer over a sliding time window.

The opposite of the variance can be used as a variability coefficient and be compared to a third threshold: the existence of a deception operation is detected if said coefficient is greater than the threshold (and no longer less than the threshold as when the variance is directly used). This comment is valid for all the values compared to a threshold.

The invention can be implemented without resorting to an operational emergency navigation.

The invention claimed is:

1. A navigation method by means of a satellite signal receiver embedded in a vehicle comprising an electronic navigation unit connected to the satellite signal receiver and to an inertial positioning unit for computing a primary operational navigation that is hybridized on the basis of inertial positioning data and satellite positioning data by applying an innovation test, the method comprising the step of controlling the vehicle according to the primary operational navigation and the following steps of:

computing a first reference navigation that is hybridized on the basis of inertial positioning data with positional corrections determined on the basis of satellite positioning data;

recovering positional corrections in latitude and in longitude provided by the first reference navigation;

performing a statistical analysis of the positional corrections in latitude and in longitude provided by the first reference navigation and deducing therefrom the existence or the absence of a deception operation of the satellite signal receiver;

emitting an alert in case of detection of a deceiving operation.

2. The method according to claim 1, wherein the first reference navigation does not implement an innovation test.

3. The method according to claim 1, wherein the statistical analysis comprises the cumulation of positional corrections provided by the first reference navigation, and the comparison of this cumulation to a first predetermined threshold to distinguish the existence of a deception operation and the absence of a deception operation.

4. The method according to claim 3, wherein the cumulation of positional corrections is performed over a sliding time window.

5. The method according to claim 1, further comprising the following steps of:

computing a second reference navigation on the basis of non-satellite positioning data;

comparing an output of the first reference navigation and an output of the second reference navigation and deducing therefrom the existence or the absence of a deception operation of the satellite signal receiver.

6. The method according to claim 5, comprising the step of determining a difference between the speed coming from the first reference navigation and the speed coming from the second reference navigation and of comparing this difference to a predetermined threshold.

7. The method according to claim 6, wherein the predetermined threshold is equal to a multiple of a standard deviation computed on the basis of a speed difference distribution law.

8. The method according to claim 7, wherein the multiple of the standard deviation computed on the basis of a speed difference distribution law is equal to 4.

9. The method according to claim 7, wherein the multiple of the standard deviation computed on the basis of the speed difference distribution law is equal to 3.

10. The method according to claim 6, wherein the predetermined threshold is equal to a predetermined speed difference value.

11. The method according to claim 10, wherein the predetermined speed difference value is equal to 3 meters a second.

12. The method according to claim 1, comprising the steps of estimating on the basis of the first reference navigation, at least one error estimation of at least one inertial sensor of the inertial positioning unit and comparing the estimation to a predetermined threshold.

13. The method according to claim 12, comprising the steps of estimating for the first reference navigation, at least one accelerometric bias and of comparing the accelerometric bias estimated to a predetermined threshold.

14. The method according to claim 13, wherein the predetermined threshold is equal to a multiple of a standard deviation computed from an error distribution law.

15. The method according to claim 14, wherein the multiple of the standard deviation computed from the error distribution law is equal to 4.

16. The method according to claim 12, comprising the steps of estimating for the first reference navigation, at least one gyrometric drift and of comparing the estimated gyrometric drift to a predetermined threshold.

17. The method according to claim 16, wherein the estimated gyrometric drift is a horizontal drift.

18. The method according to claim 16, wherein the estimated gyrometric drift is a heading drift.

19. A navigation system comprising an electronic navigation unit programmed to implement a method according to claim 1.

20. A navigation method by means of a satellite signal receiver embedded in a vehicle comprising an electronic navigation unit connected to the satellite signal receiver and to an inertial positioning unit for computing a primary operational navigation that is hybridized on the basis of inertial positioning data and satellite positioning data by applying an innovation test, the method comprising the step of controlling the vehicle according to the primary operational navigation and the following steps of:

computing a first reference navigation that is hybridized on the basis of inertial positioning data with positional corrections determined on the basis of satellite positioning data;

recovering positional corrections in latitude and in longitude provided by the first reference navigation;

performing a statistical analysis of the positional corrections in latitude and in longitude provided by the first reference navigation and deducing therefrom the existence or the absence of a deception operation of the satellite signal receiver; and emitting an alert in case of detection of a deceiving operation, wherein the statistical analysis comprises the computing of a correlation coefficient between the positional corrections in latitude and the positional corrections in longitude provided by the first reference navigation, and the comparison of the correlation coefficient to a second predetermined threshold to distinguish the existence of a deception operation and the absence of a deception operation.

21. A navigation method by means of a satellite signal receiver embedded in a vehicle comprising an electronic navigation unit connected to the satellite signal receiver and to an inertial positioning unit for computing a primary operational navigation that is hybridized on the basis of inertial positioning data and satellite positioning data by applying an innovation test, the method comprising the step of controlling the vehicle according to the primary operational navigation and the following steps of:

computing a first reference navigation that is hybridized on the basis of inertial positioning data with positional corrections determined on the basis of satellite positioning data;

recovering positional corrections in latitude and in longitude provided by the first reference navigation;

performing a statistical analysis of the positional corrections in latitude and in longitude provided by the first reference navigation and deducing therefrom the existence or the absence of a deception operation of the satellite signal receiver; and emitting an alert in case of detection of a deceiving operation, wherein the statistical analysis comprises the determination of successive correction directions on the basis of positional corrections in latitude and positional corrections in longitude provided by the first reference navigation, the computing of a variability coefficient of the correction directions and the comparison of the variability coefficient to a third predetermined threshold to distinguish the existence of a deception operation and the absence of a deception operation.

22. A navigation method by means of a satellite signal receiver embedded in a vehicle comprising an electronic navigation unit connected to the satellite signal receiver and to an inertial positioning unit for computing a primary operational navigation that is hybridized on the basis of inertial positioning data and satellite positioning data by applying an innovation test, the method comprising the step of controlling the vehicle according to the primary operational navigation and the following steps of:

computing a first reference navigation that is hybridized on the basis of inertial positioning data with positional corrections determined on the basis of satellite positioning data;

recovering positional corrections in latitude and in longitude provided by the first reference navigation;

performing a statistical analysis of the positional corrections in latitude and in longitude provided by the first reference navigation and deducing therefrom the existence or the absence of a deception operation of the satellite signal receiver;

emitting an alert in case of detection of a deceiving operation;

estimating on the basis of the first reference navigation, sensor errors of the inertial positioning unit;

comparing the error estimation of each sensor to a predetermined threshold; and emitting the alert according to the number of threshold exceedings, the probability of existence of a deception operating being proportional to the number of exceedings.

23. A navigation method by means of a satellite signal receiver embedded in a vehicle comprising an electronic navigation unit connected to the satellite signal receiver and to an inertial positioning unit for computing a primary operational navigation that is hybridized on the basis of inertial positioning data and satellite positioning data by applying an innovation test, the method comprising the step of controlling the vehicle according to the primary operational navigation and the following steps of:

computing a first reference navigation that is hybridized on the basis of inertial positioning data with positional corrections determined on the basis of satellite positioning data, positional correction being computed between a purely inertial position computed on the basis of inertial positioning data and a purely satellite position computed on the basis of satellite positioning data;

recovering positional corrections in latitude and in longitude provided by the first reference navigation;

performing a statistical analysis of the positional corrections in latitude and in longitude provided by the first reference navigation and deducing therefrom the existence or the absence of a deception operation of the satellite signal receiver; and emitting an alert in case of detection of a deceiving operation.

* * * * *